United States Patent [19]

Boone et al.

[11] Patent Number: 5,075,092

[45] Date of Patent: * Dec. 24, 1991

[54] PROCESS FOR PREPARATION OF SILANE

[75] Inventors: James E. Boone, Baton Rouge, La.; Douglas M. Richards, Houston, Tex.; Joseph A. Bossier, III, Greenwell Springs, La.

[73] Assignee: Ethyl Corporation, Richmond, Va.

[*] Notice: The portion of the term of this patent subsequent to Jul. 11, 2006 has been disclaimed.

[21] Appl. No.: 296,484

[22] Filed: Jan. 12, 1989

Related U.S. Application Data

[63] Continuation-in-part of Ser. No. 75,367, Jul. 20, 1987, Pat. No. 4,874,061.

[51] Int. Cl.$^5$ .................... C01B 33/04; C01F 7/54
[52] U.S. Cl. ..................... 423/347; 423/463; 423/495; 423/499
[58] Field of Search ............... 423/347, 463, 495, 499, 423/DIG. 5, DIG. 6

[56] References Cited

U.S. PATENT DOCUMENTS

| | | | |
|---|---|---|---|
| 2,576,311 | 11/1951 | Schlesinger et al. | 260/638 |
| 4,374,111 | 2/1983 | Lefrancois | 423/347 |
| 4,407,783 | 10/1983 | Ulmer | 423/347 |
| 4,601,798 | 7/1986 | Jacubert et al. | 204/61 |
| 4,632,816 | 12/1986 | Marlett | 423/347 |

FOREIGN PATENT DOCUMENTS

| | | |
|---|---|---|
| 823496 | 11/1959 | United Kingdom . |
| 832333 | 4/1960 | United Kingdom . |
| 838275 | 6/1960 | United Kingdom . |
| 851962 | 10/1960 | United Kingdom . |
| 909950 | 11/1962 | United Kingdom . |

OTHER PUBLICATIONS

Wherry et al., Process Instrumentation Manuel.
Welty et al., Fundamentals of Momentum, Heat and Mass Transfer, 2nd edition, p. 468.

Finholt, et al., *Use of Lithium, Aluminum, and Gallium Hydrides in Syntheses*, 1947, vol. 69, 1199-1203.
Finholt, et al., *Hydrides of the Fourth Group and their Organic Derivatives*, 1947, vol. 69, 2692-2696.
Kelly et al., "The Preparation of Transistor Grade Sili- (List continued on next page.)

*Primary Examiner*—Olik Chaudhuri
*Assistant Examiner*—Ken Horton
*Attorney, Agent, or Firm*—P. M. Pippenger

[57] ABSTRACT

A process for continuously preparing silane and a coproduct by reacting a metal hydride such as NaAlH$_4$ with a silicon halide such as SiF$_4$, utilizing, in conducting the reaction, equipment which includes, in series, a primary reactor, a secondary reactor and a separation zone. The metal hydride is reacted in the first reactor with less than a stoichiometric amount of the silicon halide, and the unreacted metal hydride is then passed to the second reactor wherein the remainder of the hydride is reacted in the secondary reactor, in which a stoichiometric excess of the silicon halide is added. The rate of silicon halide or metal hydride addition is governed by a temperature differential feed back from the reaction in the secondary reactor so that overall a stoichiometric or substantially stoichiometric operation is achieved. Techniques are also disclosed for splitting the silicon halide feed between the liquid and vapor phases of the secondary reactor to eliminate the hazard of combustible mixtures, and, with variable speed agitation of the liquid, to control the mass transfer characteristics of the reaction. Also, consistant kinetics result from control of residence time by varying the liquid level in the secondary reactor as related to the halide or hydride mass flow rates. These improvements conserve resources, provides improved coproduct and reduce costs.

38 Claims, 3 Drawing Sheets

OTHER PUBLICATIONS con from Silane or Analogous Compounds", Final Report Under Contract No. AF19(604)-1928 (1957).

Lewis et al., "The Preparation of Transistor Grade Silicon from Silane or Analogous Compounds", Final Report under Contract No. AF19(604)-3464 (1959).

Clasen, Dr. H., *Angew. Chem.*, 1961, No. 10, pp. 322-331 (and partial translation).

Lewis et al., "Preparation of High-Purity Silicon from Silane", *Journal of the Electrochemical Society*, 1961, vol. 108, No. 12, 1114-1118.

Academic Press, *The Chemistry of Complex Aluminohydrides*, 1966, vol. VIII, pp. 283-335.

W. L. Jolly editor, *Inorganic Syntheses*, 1968, vol. XI, pp. 174-175.

Yusa, et al., "Ultrahigh Purification of Silane for Semiconductor Silicon", *J. Electrochem. Society*, 1975, pp. 1700-1705.

Padma et al., *Journal of Fluorine Chemistry*, 14 (1979), "Silicon Tetrafluoride: Preparation and Reduction with Lithium Aluminum Hydride", pp. 327-329.

*Chemical Journal of Chinese Universities*, vol. 3, No. 2, 1982, pp. 169-172.

*Chemical Abstracts*, 1963, vol. 59, Abstract 6023f-Reduction of Silicon Tetrafluoride and Boron Trifluoride by Calcium Hydride.

*Chemical Abstracts*, 1967, vol. 67, Abstract 22009v-Reduction of Silicon Halides.

*Chemical Abstracts*, 1969, vol. 70, Abstract 39392z-Manufacturing Monosilane from Silicon Tetrachloride and a Metal Hydride.

*Chemical Abstracts*, 1984, vol. 101, Abstract 75269g--Production of High Purity Silane.

PROCESS FOR PREPARATION OF SILANE

REFERENCE TO RELATED APPLICATIONS OR PATENTS

This is a continuation-in-part of application Ser. No. 075,367, filed July 20, 1987, now U.S. Pat. No. 4,874,061 by Joseph A. Bossier III, Douglas M. Richards and Lloyd T. Crasto.

The parent application and this application are directed to subject matter related to U.S. Pat. No. 4,632,816 which was issued on Dec. 30, 1986 to E.M. Marlett. This application, the parent application, and the patent are commonly assigned.

1. FIELD OF THE INVENTION

This invention relates to the production of silane from a metal hydride and a silicon halide, particularly to the production of silane and a high purity coproduct. In particular, it relates to a process for the coproduction of silane and a high purity fluoride-containing product from a metal hydride, notably an alkali metal hydride or alkali metal aluminum hydride, and a silicon tetrahalide, notably silicon tetrafluoride.

2. BACKGROUND

Applicants are unaware of any prior art that describes the continuous, stoichiometric or virtually stoichiometric process described herein, or that describes application of the method to the production of silane from a silicon halide and a metal hydride.

Chemical reactions for the preparation of silane from metal hydrides are known in the art:

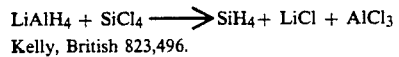
(1)
Kelly, British 823,496.

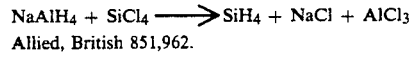
(2)
Allied, British 851,962.

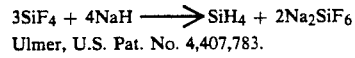
(3)
Ulmer, U.S. Pat. No. 4,407,783.

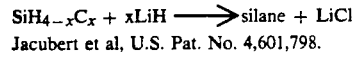
(4)
Jacubert et al, U.S. Pat. No. 4,601,798.

Reaction of hydrides such as sodium hydride and lithium hydride with halosilanes, using a zinc catalyst. (5)
DuPont, British 909,950.

Reaction of $SiF_4$ and $LiAlH_4$. (6)
Padma, J. of Fluorine Chemistry 14 (1979) 327-329.

In addition to the reactions disclosed in the literature cited above, E.M. Marlett (U.S. Pat. No. 4,632,816, supra), discovered the reaction:

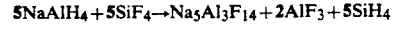
(7)

The Marlett patent, supra, discloses a process for the production of silane from a silicon tetrafluoride and a sodium aluminum tetrahydride or potassium aluminum tetrahydride, or mixture thereof. The reaction is carried out in a single reaction vessel, preferably it is suggested, by reacting a stoichiometric excess of the sodium aluminum tetrahydride, or potassium aluminum tetrahydride, with the total silicon tetrafluoride reactant. The stoichiometric excess of the metal hydride, it is suggested by the Patentee, is employed to eliminate boron impurities to produce a higher purity silane, and suppress the formation of undesirable products. The operation includes the use of a batch, or continuous back-mixed reactor, operated at conditions which causes the reaction to approach completion. This process, albeit a meritorious advancement in the state-of-the-art, leaves something to be desired. For example, the use in the reaction of excess sodium aluminum hydride, besides wasting valuable raw materials, results in the contamination of the sodium aluminum fluoride coproduct, a valuable material for use in the Hall aluminum process. The sodium aluminum floride during storage reacts with mositure to produce a hazardous condition. Worse perhaps, during the operation of the process the sodium aluminum hydride decomposes to form metallic aluminum which often creates maintainance problems by plating upon and fouling process equipment. Agitator blades and pumps as a result, e.g., have been damaged. Moreover, the silane product, due to its high solubility in the solvents, has been lost to waste; and flashing off the solvent provides only a partial solution to this loss, as well as resulting in the production of additional metallic aluminum by decomposition of the sodium aluminum hydride.

Application Ser. No. 075,367, supra, discloses a process for the continuous production of silane, and a halogenated coproduct, by the reaction of a silicon halide, notably silicon tetrafluoride, with a metal hydride, notably an alkali metal hydride or alkali metal aluminum hydride. The reaction, which is exothermic, is conducted by transfer of the reactants, in a slurry, between two separate reaction zones, a first generally relatively large volume reaction zone wherein the metal hydride is reacted with less than a stoichiometric quantity of the silicon halide, and a second generally relatively small volume reaction zone wherein the unreacted metal hydride, or metal hydride remaining in the slurry, is reacted with a quantity of silicon halide in excess of that required to react with the unreacted, remaining metal hydride. In the overall operation, a substantially stoichiometric reaction and high stability are achieved by feeding the same molar amounts of the metal hydride and silicon halide to the two reaction zones while regulating and controlling the flow of reactants between the two reaction zones. In accordance with this control scheme, the difference between the temperature of the reaction medium of the secondary reaction zone and the inlet temperature to the secondary reaction zone is sensed, and the differential temperature is used to regulate and control the flow of silicon halide to the secondary reaction zone.

The stoichiometric, staged reaction sequence has eliminated certain drawbacks of the Marlett process. For example, the chemical raw materials loss has been curtailed, and safety hazards reduced. The aluminum plating problem has been largely eliminated, and there is less contamination of the sodium aluminum fluoride coproduct with sodium aluminum hydride. Albeit however the process of application Ser. No. 075,367 represents a noteworthy achievement in having advanced the state-of-the-art relating to the production of silane, and a higher purity fluoride salt coproduct, further improvements are desirable. For example, it remains an objective to maintain the very low level of sodium aluminum hydride in the sodium aluminum fluoride coproduct, yet reduce the level of siliceous impurities in the sodium aluminum fluoride. Thus, the sodium aluminum fluoride product is yet often contaminated with silicates, at least one of which has been identified as $Na_2SiF_6$, generally analytically reported with other siliceous impurities as $SiO_2$. The latter impurity forms as the result of a secondary reaction between the silicon tetrafluoride and the sodium aluminum fluoride coproduct, this differing of course from the primary reaction between the silicon tetrafluoride and the sodium aluminum hydride reactants which forms silane, and the coproduct sodium aluminum fluoride.

3. OBJECTS

It is, accordingly, a primary object of the present invention to provide a further improved process for the production of silane, and a halogenated coproduct in the reaction of a silicon halide, notably silicon tetrafluoride, with a metal hydride, notably an alkali metal hydride or alkali metal aluminum hydride.

In particular, it is an object of this invention to provide improvements in a continuous staged process wherein, in a first reaction zone a metal hydride is reacted with less than a stoichiometric quantity of a silicon halide, a second reaction zone in series therewith wherein the unreacted metal hydride from said first zone is reacted with a quantity of silicon halide in excess of that required to react with said unreacted metal hydride, and the temperature differential between the temperature of the reaction mixture of said second reaction zone and the temperature of the reaction product of said first stage introduced into said second reaction zone is utilized as a signal to control the process stoichiometry, viz. the amount of silicon halide introduced into said second reaction zone, or the amount of metal hydride introduced into said first reaction zone, or both.

More specifically, it is an object of this invention to provide improvements in the operation of the second reaction zone, or second reactor, which better controls the mass transfer characteristics of the silicon halide, notably $SiF_4$, from the vapor, or bubble phase to the liquid bulk phase to enhance reaction between the silicon halide and the metal hydride, or metal aluminum hydride, while at the same time suppressing secondary reactions between the silicon halide and by products formed in the reaction, this comprising splitting the flow of silicon halide to the second reaction zone, one portion of which is directly injected into the liquid phase while another portion is fed into a vapor phase above the liquid phase to reduce the hazards of forming a combustible mixture, preferably while at the same time controlling and regulating the rate of agitation of the liquid in said second reaction zone. Preferably also, the residence time of the liquid within the second reaction zone is also maintained within specific limits to control the kinetics of the reaction.

4. SUMMARY OF THE INVENTION

This invention relates to improvements in a process which basically comprises a continuous method for the formation of silane by the reaction of a silicon halide with a metal hydride, involving overall a stoichiometric or substantially stoichiometric reaction between the silicon halide and the metal hydride. The method comprises conducting the reaction in a loop system that comprises two reaction zones and a separation zone, a first reaction zone (primary reactor) being preferably larger than the other (secondary reactor), and most of the reaction is preferably conducted in the primary reactor. Preferably, metal hydride is continuously added at a substantially constant rate and in stoichiometric excess to the primary reactor, while in the secondary reactor, silicon halide is continuously added in stoichiometric excess to the hydride present in that reactor. The excess metal hydride in the effluent from the first reactor is contacted with the silicon halide in the second reactor, and thereafter the fluoride containing reaction coproduct is separated. The exposure of the minor amount of metal hydride contained in the effluent from the first reactor, with the large amount of silicon halide introduced in the second reaction zone, helps insure that the solid fluoride-containing coproduct is free, or substantially free, of metal hydride starting material; this being a key feature of the invention since it enhances the purity (and/or the utility) of the coproduct. When the coproduct is separated, it is usually removed along with liquid(s) employed as the reaction medium. The liquid(s) can be separated from the solid coproduct, and if desired, the separated liquid material can be recycled.

The exothermic heat of reaction is used to control the overall process stoichiometry. Since metal hydride is reacted with silicon halide in the secondary reactor, heat is produced in the second reaction zone. The difference in temperature (differential temperature) between the primary reactor effluent entering the secondary reactor, and the reaction mass inside the secondary reactor, is used to generate a signal; and that signal is employed to continuously adjust the flow of a reactant to a given reactor, preferably the flow of silicon halide to the secondary reactor. This continuous adjustment results in a stoichiometric or substantially stoichiometric operation.

As stated above, this invention is admirably suited for use with the silane preparation method discovered by E.M. Marlett, supra; most preferably with the reaction of $NaAlH_4$ and $SiF_4$ depicted by equation (7) above. (Marlett's invention also comprises the reaction of $KAlH_4$ with $SiF_4$. However the sodium analog of $KAlH_4$ is less expensive, and therefore its use in the instant invention is preferred.)

A key feature of the Marlett process is that it readily forms silane from $SiF_4$ and $NaAlH_4$. Another key feature is the low level of organic impurity in the fluoride-containing, solid coproduct ($Na_5Al_3F_{14} \cdot 2AlF_3$). (For purposes of this invention, this product can be considered to be $NaAlF_4$. Because the organic content is low, the coproduct can be used as an additive in the Hall aluminum process, i.e. as an additive to the Hall cell to adjust the Na-to-F ratio. If the level of organics in the coproduct was high, utility in the Hall cell would be lessened or made non-existent. This is because Hall cells are operated at high temperatures and the environment therein is rigorous. Consequently, if the level of organics in an additive is too high, dangerous fires can occur if the additive is added to a Hall cell while the cell is in operation. Therefore, the level of organics must be kept low.

Likewise, the $NaAlH_4$ content (of the Marlett coproduct) must also be kept low in order to enhance utility of the coproduct as an additive for aluminum production. If the $NaAlH_4$ content is too high, dangerous fires might occur in the Hall cell, caused by ignition and burning of hydrogen released from the metal hydride. Fortunately, application of the process of the instant invention to the Marlett process produces a coproduct having a very low level of $NaAlH_4$ contained therein. As stated above, this is a key feature of the instant invention. Sodium aluminum hydride is virtually impossible to separate from the fluoride containing coproduct. Hence, coproduct contaminated with too much NaAlH$_4$ is not only unsuitable for Hall cell use, but it cannot be economically upgraded for that use, by known means.

A skilled practitioner will recognize that the lithium-fluorine coproduct—that is produced by reaction of silicon tetrafluoride and lithium aluminum hydride—might also be useful in the Hall process if the organic and hydride impurity levels are low enough. This is so because lithium is used with fluorine in the production of aluminum. Experimentation by applicants' co-worker E.M. Marlett has shown that the organic level of the lithium-aluminum-fluoride coproduct is low; although not as low as in the analogous sodium containing coproduct produced under similar conditions. However, in view of the low level of organic impurity, the process of the instant invention will made an attractive lithium-aluminum-fluorine coproduct when applied to the process comprising reaction between SiF$_4$ and LiAlH$_4$. Moreover, the heat of reaction between SiF$_4$ and LiAlH$_4$ is high enough for this invention to be used, and thereby improve the process of reacting those two substances.

Generally speaking, the reactions of metal hydrides with halosilanes is characterized by high heats of reaction. Hence, the process of this invention is widely applicable to upgrade such reactions when it is desired to react such materials in a stoichiometric or substantially stoichiometric, continuous procedure to avoid contamination of the solid coproduct with the solid starting material. Hence, for example, the process of this invention can be used to react NaAlH$_4$ or LiAlH$_4$ with SiCl$_4$ or SiF$_4$ to produce silane and a halogen-containing coproduct.

5. BRIEF DESCRIPTION OF THE DRAWINGS

FIG. 1 is a schematic representation of an embodiment of this invention. It shows two reaction zones, one of which is primary and the other secondary. It shows that a stream of sodium aluminum hydride enters the primary reactor, and SiF$_4$ the other reactor. The drawing has an overall material balance obtained when the system is operating stoichiometrically under a given set of conditions (Example 1).

6. DESCRIPTION OF PREFERRED EMBODIMENTS

Figure 1:
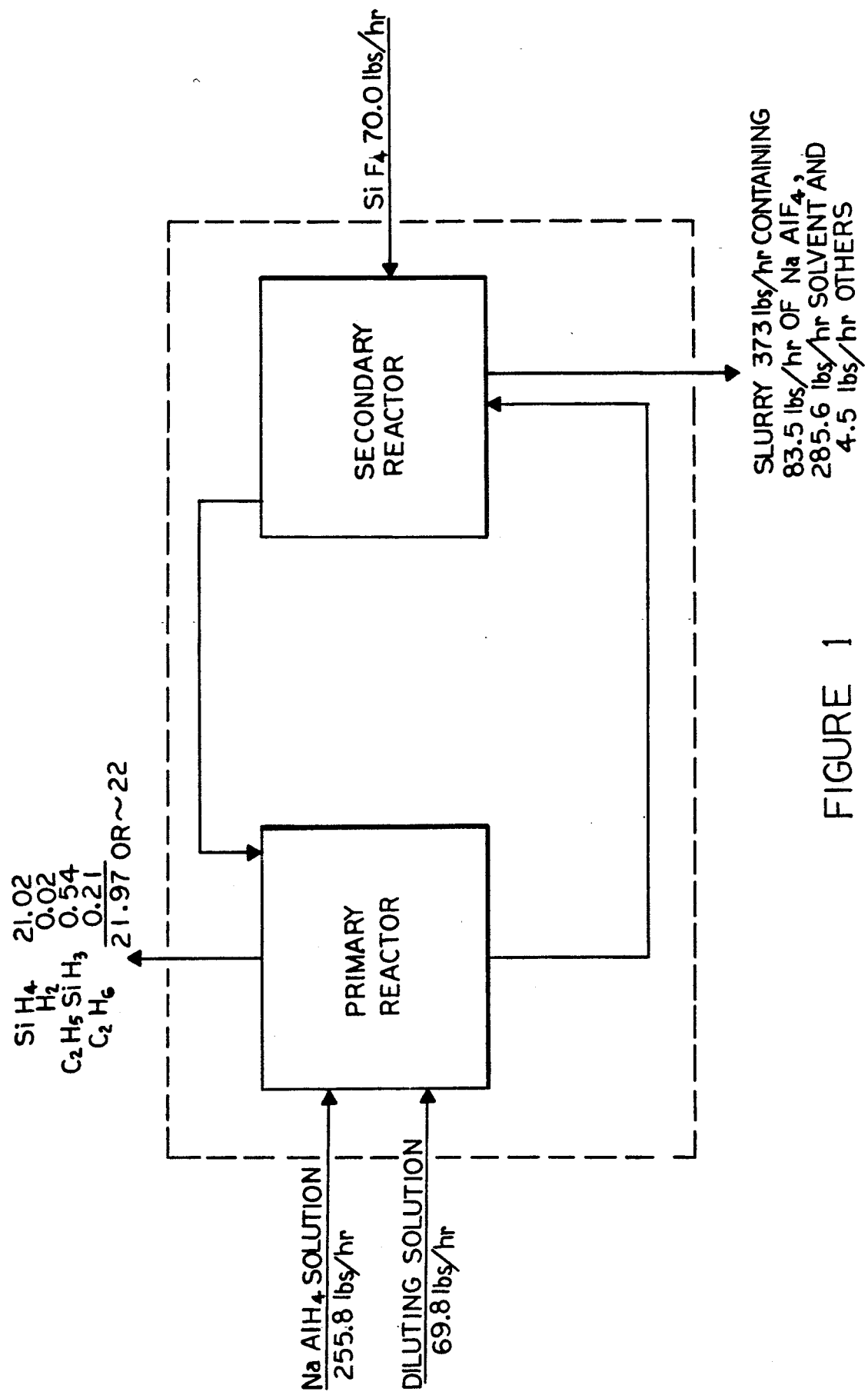

This invention relates to improvements in a process disclosed and claimed in Ser. No. 075,367, supra, for preparing silane and a coproduct comprising a metal and a halogen. It includes the steps comprising:

(A) reacting in a first reaction zone and in a liquid reaction medium, a metal hydride preferably selected from alkali metal hydrides and alkali metal aluminum hydrides, with less than a stoichiometric quantity of a silicon halide selected from compounds having the formula SiX$_4$, wherein X is fluorine, chlorine, or bormine;

(B) reacting in a second reaction zone, metal hydride remaining in the liquid reaction medium (which also contains liquid/solid reaction product produced by step A), above which is provided a vapor space, with a quantity of SiX$_4$ in excess of that required to react with said remaining metal hydride;

(C) separating in a separation zone, a gaseous fraction comprising silane and unreacted silicon halide from solid reaction product suspended in diluting solution and produced in said reaction zones;

(D) recovering said silane;

(E) introducing unreacted silicon halide from said second reaction zone into said first reaction zone to react with an additional quantity of metal hydride;

(F) determining the difference in temperature between the temperature of reaction liquid in said second reaction zone, and the temperature of reactant liquid substantially immediately prior to entry into said second zone; and (G) utilizing a signal derived from said difference in temperature to regulate the flow of a reactant to a reaction zone, e.g., the flow of silicon halide to the second reaction zone, to achieve stoichiometric or substantially stoichiometric reaction of the total amounts of silicon halide and metal hydride reacted in both reaction zone, and (H) splitting the SiX$_4$ reactant introduced to said second reaction zone (B) into two streams, (a) a first SiX$_4$ stream which is introduced directly into the liquid reaction mixture to better control mass transfer between the liquid and gaseous phases, and (b) a second SiX$_4$ stream which is introduced into the separation zone or directly into the vapor space above said liquid reaction mixture to suppress the formation of combustible gaseous mixtures, or both.

In further preferred embodiments, the liquid reaction mixture of said second reaction zone is also agitated by stirring at agitation levels which further controls the mass transfer characteristics between the liquid and gaseous phases. Additionally, the residence time of the liquid reaction mixture in the second reaction zone is set to control the kinetics of the reaction.

In highly preferred embodiments, the metal hydride is an alkali metal NaH and LiH or an alkali metal aluminum hydride selected from LiAlH$_4$, NaAlH$_4$ and KalH$_4$, and the silicon halide is SiF$_4$ or SiCl$_4$. For the purpose of this invention, SiI$_4$ and SiBr$_4$ are considered equivalents to the SiF$_4$ and SiCl$_4$ reactants. Also, mixed silicon halides, wherein at least two halogens are present, are also considered equivalents of the SiX$_4$ reactants. Such equivalents are illustrated by SiBr$_2$Cl$_2$, SiF$_2$Cl$_2$, SiFCl$_2$Br, SiF$_2$ClBr, and the like. For purposes of this invention other metal hydrides such as MgH$_2$ and Ca(AlH$_4$)$_2$ are considered equivalents of the metal hydrides mentioned above.

Figure 2:
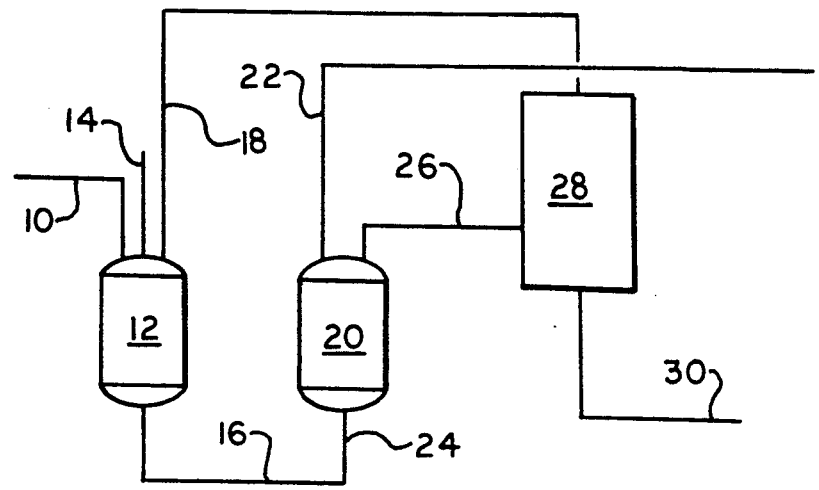
FIG. 2 is a schematic drawing, not to scale, of a reactor loop system that can be used to conduct the process of this invention.

This invention, like that disclosed in patent application Ser. No. 075,367, also comprises the reaction loop utilized to conduct the process. Referring to FIG. 2, sodium aluminum hydride in a solution is taken from a source thereof (not shown), and introduced via line 10 into reaction vessel 12, the primary reaction vessel. That vessel may be made of carbon steel or other suitable substance. In a preferred embodiment, the NaAlH$_4$ is admixed with a hydrocarbon such as toluene, and an ether such as diglyme, or monoglyme (dimethoxyethane, DME). Reaction vessel 12 is fitted with a stirrer (not shown), silane exit means 14, and slurry exit means 16. Moreover, vessel 12 is also fitted with fluid entry means 18, through which $SiF_4$ (from downstream separation zone 28) is introduced.

The streams introduced via lines 10 and 18 are admixed in vessel 12, and the $NaAlH_4$ and $SiF_4$ so introduced are caused to react. To enhance mixing the reactants, $SiF_4$ can be sparged into the liquid containing the $NaAlH_4$. By state-of-the-art temperature regulating means (not shown), the reaction temperature is maintained between about 10° C. and about 80° C.; preferably between about 30° and about 60° C.

By-product effluent containing metal-aluminum-fluoride coproduct is removed from the reaction vessel via line 16. This effluent contains fluoride-containing by-product ($Na_5Al_3F_{14}+2AlF_3$, or $NaAlF_4$) and liquid reaction medium. It also contains some unreacted $NaAlH_4$, since the process is purposely conducted so that less than an equimolar amount of $SiF_4$ is introduced into vessel 12. Preferably, from about 90% to 99% by weight of the $NaAlH_4$ is reacted in that vessel.

More preferably, from about 95-99% of the $NaAlH_4$ is reacted in the primary reaction vessel. In general, it is desirable (a) to react most of the $NaAlH_4$ in that vessel, with the proviso that (b) enough $NaAlH_4$ is reacted in the secondary vessel to give a temperature increase in that vessel which will provide (c) a differential temperature high enough to generate a sufficiently sensitive signal to (d) regulate the flow of $SiF_4$ with enough precision in order to (e) achieve stoichiometric, or substantially stoichiometric reaction.

Continuing the reference to FIG. 2, slurry from vessel 12 enters secondary vessel 20 via line 16. Vessel 20 can also be made of carbon steel or other similar substance. The vessel can be considerably smaller in capacity than the primary reaction vessel; for example, if vessel 12 is about 45 gallons (~170 liters) then vessel 20, can be about 10 gallons (~38 liters). In vessel 20, the slurry is contacted at reaction temperature (see above) with $SiF_4$ introduced into the vessel through line 22. The amount (i.e. the rate) of $SiF_4$ introduced is controlled in order to be stoichiometrically equal to the amount of $NaAlH_4$ introduced into reactor 12 via line 10. At any given instant, the reaction system may be somewhat out of stoichiometry, but over time with sufficient iterations about the reaction loop, stoichiometry or near stoichiometry is achieved. As stated above, the differential temperature between the liquid temperature inside vessel 20 and the liquid temperature upstream thereof at a point 24 (inside line 16) is used to generate a signal to regulate $SiF_4$ flow. The signal can open or close valve means (not shown) in line 22 to increase or decrease the amount of $SiF_4$ introduced into vessel 20. The temperature measurements inside and outside the reactor, i.e. in vessel 20 and in line 16 can be determined by any suitable means such as a resistance temperature detector (RTD).

From vessel 20, material flows through line 26 into separation zone 28. In that zone, silane and unreacted $SiF_4$ plus other gaseous material(s) if present, are separated from the solid reaction product ($Na_5Al_3F_{14}+2AlF_3$, or $NaAlF_4$). The solid product is removed via line 30 for further processing. The gaseous material is transported via line 18 into vessel 12 thereby closing the loop.

Figure 4:
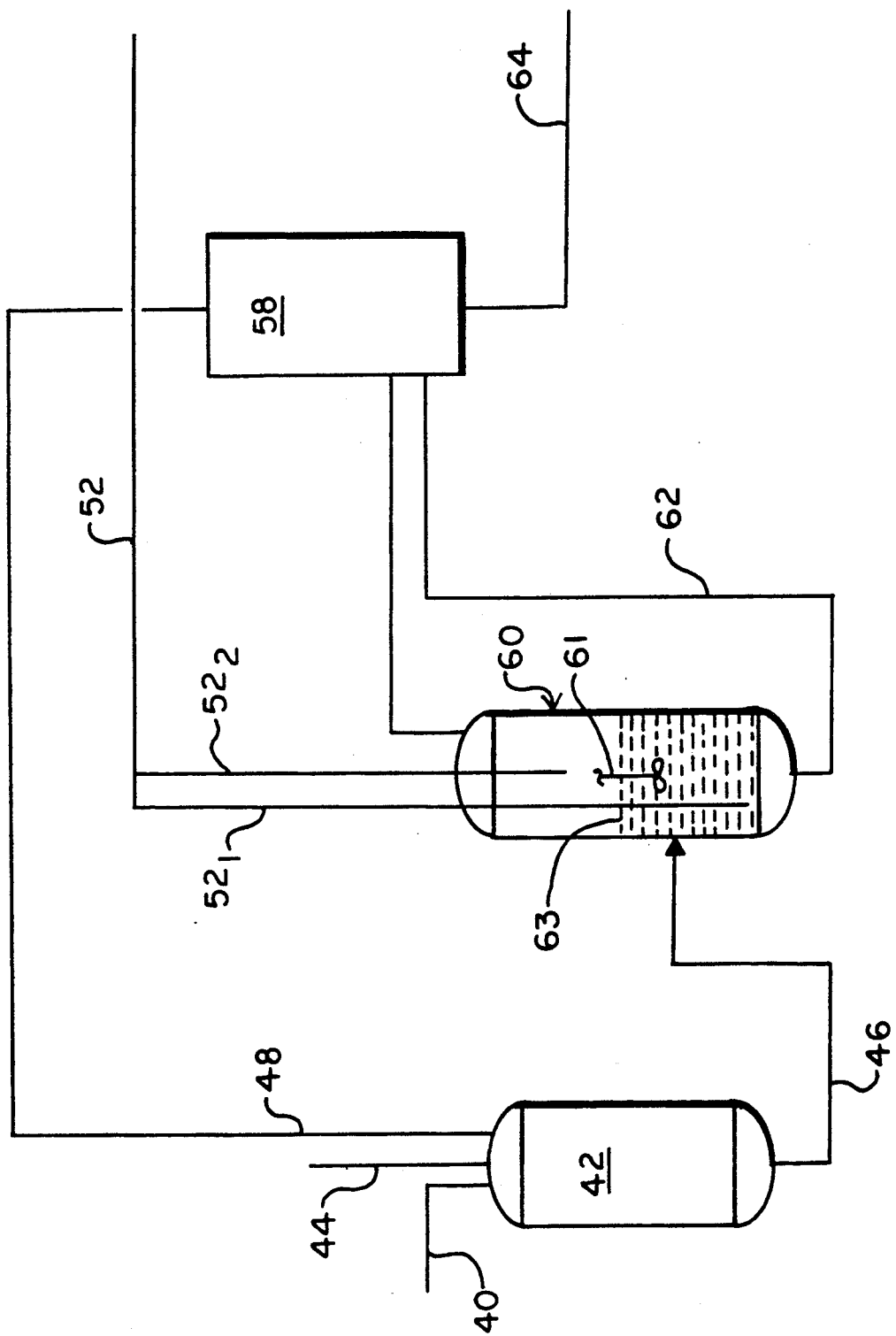
FIG. 4 is a schematic representation of a further improved process, as claimed herein.

Reference is now made to FIG. 4 which embodies generally the process scheme described by reference to FIG. 2, but further includes features which better control the mass transfer of the silicon halide, notably $SiF_4$, from the vapor, or bubble phase to the liquid bulk phase of the secondary reactor. The secondary reactor in accordance with this, a preferred process embodiment, thus includes means for splitting the flow of $SiF_4$ into the secondary reactor, and variable speed mixing sufficient to produce substantially complete reaction between the silicon halide, or $SiF_4$, and the metal hydride or metal aluminum hydride in the liquid phase to produce silane and a fluorided salt, notably metal aluminum fluoride, while at the same time minimizing secondary reactions which produce siliceous impurities, $SiO_2$. Liquid level control is also provided to maintain consistent liquid residence time, and consequently better control the reaction kinetics.

Sodium aluminum hydride in solution is fed via line 40 into the primary reactor 42 and contacted and reacted with less than a stoichiometric amount of the $SiF_4$ introduced as a gas into reactor 42 via line 48, while a gaseous silane product is removed from the reactor 42 via line 44. A slurry containing un-unreacted sodium aluminum hydride is withdrawn from the bottom of reactor 42 via line 46 and introduced into reactor 60, the secondary reactor of the series. Features which distinguish the operation of the secondary reactor 60 over the operation described by reference to FIG. 2 are: (1) The $SiF_4$ introduced into the reactor 60, in this instance via line 52, is split into two streams, a first which is fed via line $52_1$ directly into the liquid phase, and a second which is fed via line $52_2$ into the vapor space of reactor 60; (2) A variable speed mixer, or agitator 61 employed to stir the liquid of the reactor; and (3) A line 62 which is provided to control the liquid residence time while maintaining a constant liquid level within the reactor. The positive injection of a stream of $SiF_4$ directly into the vapor space of the reactor 60 more effectively maintains sufficient $SiF_4$ therein to suppress the build up of flammable gaseous mixtures, and the direct injection of a controlled amount of $SiF_4$ into the liquid supplied sufficient $SiF_4$ for rapid reaction between the $SiF_4$ and the sodium aluminum hydride to produce silane and sodium aluminum fluoride; while at the same time suppressing secondary reactions which produce siliceous impurities, or $SiO_2$. As previously discussed, sufficient of the $SiF_4$ is introduced via line 52 to be stoichiometrically equal to the amount of sodium aluminum hydride introduced via line 40 into the reactor 42, but better control of the mass transfer of $SiF_4$ into the liquid phase for reaction with the sodium aluminum hydride is provided by feeding just sufficient of the $SiF_4$ into the liquid phase to react with the sodium aluminum hydride, this being determined by balance between the rate of $SiF_4$ input into the liquid phase and the amount of agitation provided the liquid. Generally, this balance is provided by feeding from about 20 percent to about 40 percent, preferably from about 23 percent to about 30 percent, of the $SiF_4$ via line 52, directly into the liquid phase, while feeding the balance of the $SiF_4$ via line $52_2$ into the vapor phase of the reactor—viz. from about 60 percent to about 80 percent, preferably from about 70 percent to about 77 percent, of the $SiF_4$. Expressed in terms of molar ratios, this means that generally from about 0.20 to about 0.40, preferably from about 0.23 to about 0.30, of the total amount of $SiF_4$ introduced into the second reaction zone is introduced directly into the liquid reaction mixture; the balance being introduced directly into the vapor space above the liquid reaction mixture. The variable speed agitator 61 is adjusted to run at a rate of speed sufficient to reduce the extent possible, consistent with the amount of SiF$_4$ introduced directly into the liquid, the rate of reaction between the SiF$_4$ and the by-product sodium aluminum fluoride, and increase to the extent possible, consistent with the amount of SiF$_4$ introduced directly into the liquid, the reaction between the SiF$_4$ and the sodium aluminum hydride to form silane. In general, it has been found that the liquid of the reactor 60 should be stirred at a rate ranging from about 0.0012 to about 0.0550 H.P./gal. (horsepower/gallon), preferably from about 0.0033 H.P./gal. to about 0.0068 H.P./gal., for optimizing at these input levels of SiF$_4$ into the liquid phase the rate of reaction between the SiF$_4$ and the sodium aluminum hydride, and minimizing the rate of reaction between the SiF$_4$ and the sodium aluminum fluoride. The adjusted speed of the agitator 61 in concert with the measured amount of SiF$_4$ injected directly into the liquid phase of the secondary reactor thus regulates and controls the reaction of the SiF$_4$ and the sodium aluminum hydride to produce silane and sodium aluminum fluoride, while at the same time minimizing secondary reactions which produce siliceous materials other than silane.

The liquid level within the secondary reactor 60 is maintained at a constant level, consistent with the rate of SiF$_4$ introduced via line 52$_1$ directly into the liquid and the amount of agitation supplied to the liquid by the agitator 61, to provide a liquid residence time ranging generally from about 0.5 minutes to about 30 minutes, and preferably from about 5 minutes to about 10 minutes. It is generally preferable to operate on the low side of these ranges to optimize and carry to completion the reaction between the SiF$_4$ and sodium aluminum hydride, while at the same time minimizing or suppressing the secondary reaction between the SiF$_4$ and the sodium aluminum fluoride.

In the operation of the unit described by reference to FIG. 4, the off gas from the reactor 60 is taken from the gas phase above the liquid level 63 and passed by line 56 directly into the separation column 58. Liquid from the bottom of reactor 60 is fed via a separate line 62 into the separation column 58, the use of separate lines to convey the gas and liquid phases, respectively, to the separation column 58 being preferable to the use of a single line because pluggage problems are greatly minimized. Within the separation column 58 the gases, liquids and solids phases are separated, the gas which is principally SiF$_4$ being conveyed via line 48 to the primary reactor 42. The liquids and solids are removed from the separation column 58 via line 64. Like the operation described by reference to FIG. 2., the overall process is in stoichiometric balance or at all times near stoichiometric balance and the process controlled by the differential temperature, or temperature difference between the temperature of the reaction mixture within reactor 60 and the temperature of the products from reactor 42 introduced into reactor 60, which is used to regulate and control the amount of SiF$_4$ introduced via line 52 into the reactor 60, or the amount of sodium aluminum hydride introduced via line 40 into reactor 42, or both.

A skilled practitioner will recognize that pump means are used to move the streams as described; these need not be shown since they are within the art.

One of the features of this invention is that the sodium aluminum hydride employed in the embodiment being described need not be pure. It can be used in the mixture produced by reacting aluminum and sodium (or sodium hydride) with hydrogen under pressure and in the presence of an aluminum alkyl catalyst and a hydrocarbon medium such as toluene. Thus, NaAlH$_4$ starting material can be made in general accordance with one or the other methods of Ashby; U.S. Pat. No. 4,045,545, U.S. Pat. No. 4,981,524. Other methods are known: for example, U.S. Pat. No. 4,528,176, and 4,529,580.

the following non-limiting examples are illustratively typical of considerable operating experience gained while developing this invention. Reference is first made to Example 1. The reaction vessels had about the dimensions given above (170 and 38 liters). They were equipped in general accordance with the embodiment illustrated by FIG. 2. The sodium aluminum hydride feed stream is 14% sodium aluminum hydride, but it is diluted to 11% for conducting the reaction.

EXAMPLE 1

(I) Bases:
(1) Feed rate of SiF$_4$ to secondary reaction vessel is 70 pounds per hour (31.8 kg per hour).
(2) Analysis of sodium aluminum hydride solution used as starting materials:

| | |
|---|---|
| 14% | sodium aluminum hydride |
| 0.85% | NaAl(C$_2$H$_5$)$_2$H$_2$ (OMH-1) |
| 0.60% | Na$_3$AlH$_6$ |
| 0.20% | aluminum metal |

(3) 98.5% of NaAlH$_4$ reacts in primary reactor; balance in secondary reactor.
(4) All OMH-1 reacts in secondary reactor.
(5) 1 mole of SiF$_4$ reacts with 2 moles of OMH-1.
(6) SiH$_4$ Product contains 1.5 mole % H$_2$, 13,000 ppm C$_2$H$_5$SiH$_3$ (mole basis), 10,000 ppm C$_2$H$_6$ (mole basis).
(7) Neglect any DME decomposition and DME leaving entrained with SiH$_4$.
(8) 70 pounds per hour (31.8 kg/hr) SiF$_4$ feed rate.
(9) molecular weights:

| | |
|---|---|
| Silane | 32 |
| SiF$_4$ | 104 |
| NaAlH$_4$ | 54 |
| NaAl(C$_2$H$_5$)$_2$H$_2$ | 110 |
| C$_2$H$_5$SiH$_3$ | 60 |

(II) Calculation of hydrides reacted per hour
Let x = pounds per hour SiF$_4$ react with NaAlH$_4$
Let y = pounds per hour SiF$_4$ react with OMH-1

$$NaAlH_4 = \frac{54 (x)}{104} = 01.5192x$$

$$OMH\text{-}1 = \frac{2 \times 110 (y)}{104} = 2.1154y$$

$$\frac{NaAlH_4}{OMH\text{-}1} = \frac{.5192x}{2.1154y} = \frac{14}{0.85}$$

$$\frac{x}{y} = 67.1069$$

x + y = 70
 = 70 pounds SiF$_4$ per hour or
 31.8 kg per hour.

67.1069y + y = 70
68.1069y = 70
y = 1.02 pounds per hour or 0.46 kg/hour

-continued x = 70.0 − 1.02 = 68.98 pounds per hour or
31.4 kg/hour (III) Calculation of amount of solution to be utilized per hour at 11% dilution $$\text{NaAlH}_4 \text{ solution} = \frac{(0.5192)(68.98)}{0.11}$$

= 325.6 lbs per hour, or
148 kg per hour

NaAlH$_4$ = (0.5192)(68.98)

= 35.8 lbs per hour, or
16.3 kg per hour $$\text{NaAlH}_4 \text{ feed solution} = \frac{(0.5192)(68.98)}{0.14}$$

= 255.8 pounds per hour or
116.3 kg/hour (IV) Calculation of amount of diluent required per hour Diluting solution required = 325.6 − 255.8
= 69.8 lbs per hour
= 31.7 kg per hour (V) Sum of Materials Added

| | Pounds/hour | Kg/hour |
|---|---|---|
| SiF$_4$ | 70 | 31.8 |
| NaAlH$_4$ Solution | 255.8 | 116.3 |
| Dilutiing Solution | 69.8 | 31.7 |
| | 395.6 | 179.8 |

(VI) Solvent in NaAlH$_4$ feed 255.8 × [1.00 − (0.14 + 0.0085 + 0.006 + 0.002)]
= 215.8 lbs/hr or 98.1 kg/hr (VII) Gaseous Products $$\text{Amount of SiH}_4 \text{ produced} = \frac{(0.5192)(68.98) \times 32}{54}$$

= 21.2 lbs per hour or
9.6 kg per hour $$\text{C}_2\text{H}_5\text{SiH}_3 \text{ produced} = 60 \times \frac{21.2}{32} \times \frac{13{,}000}{10^6} \times \frac{1}{0.962}$$

= 0.54 lbs/hr or 0.24 kg/hr

[The factor (1/0.962) takes into account the molar purity of SiH$_4$ relative to H$_2$, C$_2$H$_6$, and ethyl silane.]

$$\text{C}_2\text{H}_6 \text{ produced} = 30 \times \frac{21.2}{32} \times \frac{10{,}000}{10^6} \times \frac{1}{0.962}$$

= 0.21 lbs/hr or 0.08 kg/hr $$\text{H}_2 \text{ produced} = 2 \times \frac{21.2}{32} \times \frac{15{,}000}{10^6} \times \frac{1}{0.962}$$

= 0.02 lbs/hr or 0.01 kg/hr

Sum of Gaseous Products Produced

| | lbs/hour | kg/hour |
|---|---|---|
| silane | 21.2 | 9.6 |
| hydrogen | 0.02 | 0.01 |
| C$_2$H$_5$SiH$_3$ | 0.54 | 0.24 |
| C$_2$H$_6$ | 0.21 | 0.09 |
| | 22.0 | 10 kg |

(VIII) Amount of Slurry Produced (by difference)
materials in − gases out = slurry produced
395.6 − 22 = 373.6 pounds per hour or 169.8 kg/hr (IX) NaAlH$_4$ and SiF$_4$ Reactants
Amount of NaAlH$_4$ reacting in primary reactor
35.8 × 0.985 = 35.3 lbs/hr or 16.0 kg/hr -continued Amount of NaAlH$_4$ reacting in secondary reactor
35.8 − 35.3 = 0.5 lbs/hr or 0.22 kg/hr
Amount of SiF$_4$ reacting in secondary reactor

| | | |
|---|---|---|
| OMH-1 (see II above) | 1.0 lbs/hr | 0.45 kg/hr |
| NaAlH$_4$ = 69.98 × 0.015 | 1.0 lbs/hr | 0.45 kg/hr |
| | 2.0 lbs/hr | 0.9 kg/hr |

(X) Amount of SiF$_4$ to primary reactor
69.3 − 2.04 = 68 lbs/hr or 30.9 kg/hr (XI) Amount of (NaAlF$_4$) produced from NaAlH$_4$ $$35.8 \times \frac{126}{54} = 83.5 \text{ lbs/hr or } 38.0 \text{ kg/hr}$$

(XII) Solvents leaving primary reactor
215.8 + 69.8 = 285.6 lbs/hr or 129.8 kg/hr The above calculations, which are summarized in FIG. 1, illustrates the process of this invention applied to an embodiment of the Marlett invention, i.e. the reaction summarized by equation (7) above. In this example, the sodium aluminum hydride employed was not pure; rather, it was contained in a mixture which comprised toluene, aluminum, OMH-1 and Na$_3$AlH$_6$. This mixture was formed by reacting sodium, aluminum, and hydrogen under high pressure and in the presence of toluene as a reaction medium and triethyl aluminum as a catalyst. The slurry also contained dimethoxyethane which is used to solubilize the reactants NaAlH$_4$ and SiF$_4$. The process of the example can encompass use of reactants that contain extraneous materials. For example, the SiF$_4$ need not be pure but can contain about 1% HCl. Of course, purer reactants than those used in the example may be employed if desired. Likewise the process need not contain NaAlH$_4$ in toluene. Thus for example, the NaAlH$_4$ can be admixed with one or more of the other hydrocarbons disclosed in the Ashby patents, supra. As appreciated by a skilled practitioner it is good practice to keep the NaAlH$_4$ under an inert liquid such as a hydrocarbon since the hydride is reactive to air and moisture. For the process of the example, the 14% mixture of NaAlH$_4$ used as a stock solution was diluted prior to entry into the reaction zone by mixing with additional DME/toluene mixture in order to bring the reaction mixture to a concentration of 11%.

It was found that in the equipment used to conduct the process of the invention, that operation at an NaAlH$_4$ concentration of 8–12 percent helped alleviate some pluggage problems in the lines. Obviously, the concentration of the reactants is an important, but not critical factor of the invention. For example, it is possible to run at an NaAlH$_4$ concentration of 4–6%.

The primary and secondary reactors had a capacity of about 45 and 10 gallons, respectively. This relative size is not critical. Both reactors are stirred; vigorous stirring helps diminish plugging problems.

The reaction was conducted so that 98.5% of the NaAlH$_4$ reacted in the first reactor. It is not necessary to use this fractional amount; more or less NaAlH$_4$ can be reacted as desired, so long as the heat of reaction in the secondary reactor is high enough to produce a differential temperature sufficient to generate a signal that can accurately govern the flow of SiF$_4$. Under the conditions in the example about 87,500 BTU were generated per hour. Of this heat, about 2200 BTU were generated in the secondary reactor. This was sufficient to allow use of the RTDs employed to determine the relative temperatures in the reactor and upstream thereof and to generate means to vary the flow of $SiF_4$ to the secondary reactor. The application of the use of the differential temperature to adjust $SiF_4$ flow is within the skill of the art.

The reaction of $SiF_4$ with OMH-1 is slower than with $NaAlH_4$, and for this example it appears that practically all of the OMH-1 reacts in the secondary reactor. Under the conditions employed, where 98.5% of the $NaAlH_4$ reacts in the primary reactor, the OMH-1 is exposed to a relatively great deal of $SiF_4$ in the secondary reactor. It appears that these operating conditions cause all or about all of the OMH-1 to react to yield products other than $SiF_4$. Evidence indicates that if the relative $SiF_4$ concentration is reduced, say by reacting more $NaAlH_4$ in the secondary reactor, the amount of $SiH_4$ produced from OMH-1 may increase. The amount of $Na_3AlH_6$ present in the reaction mixture is low enough that the gaseous products produced therefrom can be ignored, if the process is conducted as in the example.

The process of the above example can be modified by using one or more of the following as a replacement for $SiF_4$: $H_3SiF$, $H_2SiF_2$, $HSiF_3$, $H_3SiCl$, $H_3SiBr$, $H_2SiCl_2$, $SiCl_2F_2$, $SiClF_3$, and $SiBrF_3$.

The slurry product produced by the invention can be dried to remove solvent (toluene plus DME). After removal of the solvent by any suitable technique known in the art, the product can be ground or compacted to a desired size. The product contains little or no $NaAlH_4$ and the amount of solvent complexed with the product (and therefore not readily removed by heat the wet product) is low. Consequently the product is in a form suitable for use in Hall electrolytic cells.

The process of this invention can be used to prepare silane suitable for use as a source of electronic grade silicon. For this purpose, the silane produced by the method of this invention can be subjected to further purification. Silane can be purified by many known techniques, for example cryogenic distillation, pressure distillation, selective absorption, large scale gas chromatography and similar techniques; confer U.S. Pat. Nos. 3,019,087; 3,041,141; 3,491,517; 4,554,141 and 4,537,759.

To aid contacting the reactants, the $SiF_4$ is preferably sparged into an agitated solution of the $NaAlH_4$ using vigorous stirring to aid disposal of $SiF_4$ into the body of the liquid. Preferably, the liquid contains sufficient ether such as DME to assist the solubilization of the $NaAlH_4$ to the extent necessary for the reaction to take place under the conditions employed.

In the above example, the relative amount of dimethoxyethane and toluene in the mixture employed was about 3.6 to 1. It is not necessary to use that relative concentration. For example, toluene can be wholly absent. When it is employed, the relative concentration is not critical but for physical limitations is kept below about 30%. The toluene arises from its use in the preparation of the $NaAlH_4$ and need not be separated from the reaction mixture thereby produced. The amount of DME used is enough to appropriately dissolve the $NaAlH_4$.

The ether reaction medium can be selected from those named and described in E.M. Marlett application Ser. No. 701,947, supra. That application is incorporated by reference herein as if fully set forth.

Thus the liquid media include the polyethers such as the dimethyl ether of diethylene glycol (diglyme), the dimethyl ether of ethylene glycol (monoglyme), the dimethyl ether of triethylene glycol (triglyme), the dimethyl ether of tetraethylene glycol (tetraglyme), 1,4-dioxane, and 1,3-dioxolanes, and tetrahydrofuran (THF).

Preferred liquid reaction mediums are the polyethers. These include 1,4-dioxane, 1,3-dioxolane, the diethyl ether of ethylene glycol, the dimethyl ether of ethylene glycol, the dimethyl ether of propylene glycol, the dimethyl ether of diethylene glycol, and the like.

A more preferred class of liquid reaction mediums are the di-loweralkyl ethers of alkylene glycols. These include the diethyl ether of ethylene glycol, the dimethyl ether of propylene glycol, the dimethyl ether of diethylene glycol, and the like.

Still more preferred are the di-loweralkyl ethers of ethylene glycols. These include the dimethyl ether of ethylene dimethyl ether of triethylene glycol, and the like. The diethyl ether of ethylene glycol is an advantageous reaction medium because the normal ether cleavage attributable to solvent attack does not produce methane. The dimethyl ether of ethylene glycol is the most preferred inert liquid reaction medium. Dimethoxypropane and the dimethyl ether of propylene glycol also work well.

The preferred solvents of the invention are those which provide reasonable solubility for hydride reactant such as sodium aluminum tetrahydride or potassium aluminum tetrahydride. Reaction media other than ethers can be used; other useful medium include tertiary amines such as triethylamine, tributylamine, N-methylpyrrolidine and mixtures of such liquids.

Liquid reaction media outside the preferred class of polyethers are also generally somewhat watermiscible. Hydrocarbons can be used, but when used alone they will provide low to moderate yields of silane unless very strong agitation is used.

Of types of ethers that are mentioned, ethers that have the requisite solvent power and that are relatively low boiling materials are preferred. This is because hydrides such as $NaAlH_4$ are very reactive substances, and must be handled with care. In order to promote safety, it is better if the ether solvent be low boiling so that is can be readily separated from the reaction mixture to avoid dangerous conditions in case of a process upset.

As indicated above, dimethoxyethane (DME) has been shown to have the requisite solvent power, and it has a sufficiently low boiling point. For these reasons and because it is commercially available at an acceptable price, it offers promise as a reaction solvent. However, its use is not without some drawbacks. However, an important feature of this invention is that it provides means for substantially overcoming some of the drawbacks and allows DME to be used. For example, $NaAlH_4$ and DME mixtures can explode if the temperature gets too high and furthermore $NaAlF_4$ or other similar products can lower the decomposition temperature of this mixture. Moreover, silane and DME mixtures containing 30–70% silane are very flammable. In the process of this invention the $Na_5Al_3F_{14} \cdot AlF_3$ coproduct is continually removed. This lowers the hazard inherent with its presence in $NaAlH_4$ mixtures. Secondly, the addition of the large excess of $SiF_4$ in the secondary reactor provides $SiF_4$ in the vapor space in the separation zone and eliminates the vapor explosion hazard with DME/silane mixtures. These are important features.

There are additional, important significant features of this invention. As stated above, NaAlH$_4$ is virtually impossible to separate from NaAlF$_4$ and consequently its content therein should be minimized or more preferably, substantially eliminated. This invention provides means for keeping the NaAlH$_4$ concentration in the coproduct below unacceptable levels. Without the control mechanism provided by the invention, the NaAlH$_4$ would have to be very precisely added to the reaction vessel and this would require more costly means of addition, storage, and much more analytical support personnel time. Thus, this invention eliminates significant investment and operating expense. Moreover, as appreciated by a skilled practitioner, time consuming sampling and analytical procedures would be required if this invention were not used. As a result, analysis would be completed after a substantial time had elapsed. Since the results would not be received in real time, they would not necessarily depict current operation. Therefore, the process of this invention provides a greater degree of reaction control the would otherwise be available. It should also be appreciated by a skilled practitioner that the iterative, loop process provided by this invention also provides a greater degree of stoichiometric control than could be afforded by any simple, single back-mix reactor of economically feasible size.

This invention provides means for making silane from NaAlH$_4$ on a scale heretofore unknown. It also provides commercially acceptable SiH$_4$ and coproduct of high quality, under conditions of adequate safety. As indicated above, it also provides means for producing silane on a stoichiometric or substantially stoichiometric basis that thereby conserves materials, eliminates costly separation techniques, and significantly reduces required chemical analysis, manpower and investment. In this invention, the preparative process itself is used as an anlytical tool to control the input and usage of SiF$_4$ and NaAlH$_4$.

Furthermore, this invention allows the NaAlH$_4$ starting material to be used in the reaction mixture in which it is produced. Thus, the NaAlH$_4$ can be produced intoluene and then mixed with a DME/toluene mixture rich in DME before feeding to the reactor in which silane is produced. In short, this invention not only overcomes a set of very difficult technical hurdles, but it does so in a manner that provides many highly desirable advantages.

The reaction of NaAlH$_4$ and SiF$_4$, and similar reactions, carried out as illustrated by Example 1 can be conducted over a broad range of temperatures. A suitable range extends up to where cleavage of the liquid reaction medium, or other extraneous, undesirable side reaction occurs. Temperatures up to about 160° C. may be used. For reaction mixtures comprising ethers, a preferred range is about 0°–80° C. A more preferred range for ether solvents is about 10°–45° C. Operation should not be conducted above about 65° C. when using DME to avoid decomposition problems. Operation below about 10° C. may cause gelling problems.

The process may be conducted at, above, or below atmospheric pressure. An operable pressure range is from about one-half to 100 atmospheres (25–10,000 kPa). Atmospheric pressure is a convenient reaction pressure to use. Not much benefit is gained by using other reaction pressure since for example, the reaction of SiF$_4$ with alkali metal aluminum hydrides is not very pressure dependent.

The process is preferably carried out with agitation. Vigorous agitation improves contacting the reactants, favors the intended reaction, and diminishes side reactions which can complicate the process. Some side reactions might cause deleterious effects such as plugging, coproduct purity problems, and the like.

Since the process is exothermic, evolved heat may be removed if desired by circulating the mixture through an external heat exchanger or by using an internal cooling coil or condensing a boiling solvent. Such expedients are more preferably used in conjunction with the primary, rather than secondary reactor.

EXAMPLE 2

Figure 3:
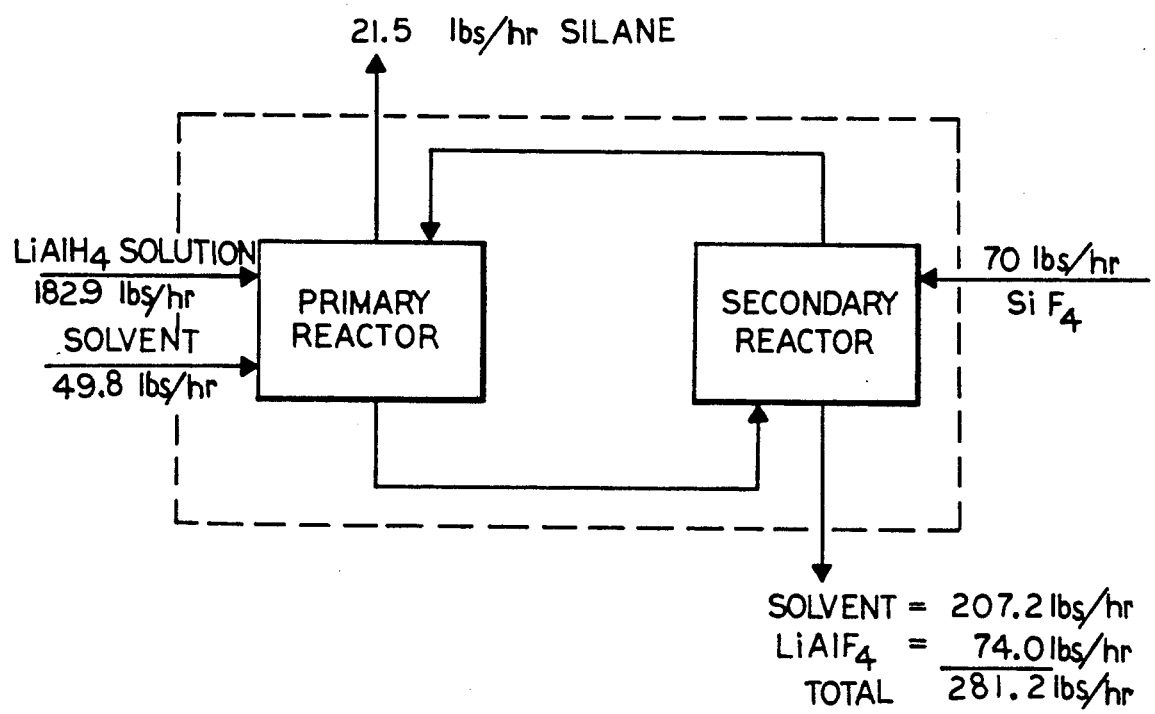
FIG. 3 is a schematic representation of an embodiment of this invention illustrated or exemplified by Example 2.

The process of this Example comprises the reaction of LiAlH$_4$ and SiF$_4$ to produce silane and a fluoride salt coproduct containing lithium and aluminum. The process results are illustrated by FIG. 3. It is conducted similarly to the process of Example 1 using the same size reactors as mentioned above. The solvent is DME, and the reaction temperature is similar to that used in the first example. Calculations that further illustrate the process are as follows:

(I) Bases

SiF$_4$ feed rate and purity same as in Example 1.

LiAlH$_4$ 100% pure and introduced as a 14% solution reacted at 11% concentration.

98.5% of LiAlH$_4$ reacts in primary reactor, remainder reacts in secondary reactor.

Neglect dimethoxyethane (DME) decomposition and DME leaving with SiH$_4$.

Molecular weight:

| | | |
|---|---|---|
| LiAlH | = | 38 |
| LiAlF$_4$ | = | 110 |
| SiF$_4$ | = | ~104 |
| SiH$_4$ | = | ~32 |

(II) Calculations of Amount of LiAlH$_4$ reacted $$= \frac{38}{104} \times 70 = 25.6 = 25.6 \text{ lbs per hour or } 11.6 \text{ kg/hr}$$

In primary reactor; 25.6 × 0.985 = 25.2 lbs per hour or 11.5 kg/hr

In secondary reactor; 25.6 − 25.2 = 0.4 = 0.4 lbs per hour or 0.2 kg/hr

As 14% solution $\frac{25.6}{0.14}$ = 182.9 lbs per hour or 83.1 kg/hr

As 11% solution $\frac{25.6}{0.11}$ = 232.7 lbs per hour or 105.8 kg/hr

Solvent present in 11% solution 232.7 − 25.6 = 207.1 lbs per hour or 94.1 kg/hr (III) Amount of Diluent solution required 232.7 − 182.9 = 49.8 lbs per hour or 22.6 kg/hr -continued (IV) Amounts of products produced Amount of SiH$_4$ = $\frac{32}{104}$ × 70.1 = 21.5 lbs per hour or 9.8 kg/hr Amount of LiAlF$_4$ = $\frac{110}{104}$ × 70 = 74.0 lbs per hour or 33.7 kg/hr From primary reactor, 74 × 0.985 = 72.9 lbs per hour or 33.1 kg/hr (V) Amount of SiF$_4$ from Secondary reactor 70.0 × 0.985 = 69.0 lbs per hour or 31.3 kg/hr The process of this Example is also conducted (as the process of Example 1) using RTDs to measure the temperature inside the secondary reactor and upstream therefrom. The noted differential temperature is used to generate a signal to govern the flow of SiF$_4$ to the secondary reactor. For this purpose a metal (platinum) film RTD is preferred over more simple constructions such as the "bird-cage" element commonly used in the laboratory. As well known by skilled practitioners the film RTD has increased resistance per given size, and since the device is relatively small, it can respond more quickly to changes in temperature. For better temperature measurement, the RTDs are used with a Wheatstone bridge, or preferably a 4-wire ohm measurement system to increase the accuracy of the temperature measurement. RTDs are more linear than thermocouples, but still require some curve fitting, as recognized by a skilled practitioner. The Callendar-Van Dusen equation can be used for curve fitting. Alternatively the 20th order polynomial can be used to provide a more accurate curve fit, as known in the art.

EXAMPLE 3

A series of runs were made each over discrete periods of time to illustrate the advantages in using split feed of silicon halide to the secondary reactor of a series of two reactors. A first portion of the silicon halide feed was fed directly into the liquid phase of said secondary reactor to control, with liquid agitation by a variable speed stirrer, the mass transfer characteristics of the reaction. While a second portion of the silicon halide was fed in Runs 3-7 to a separation column, and is Runs 8-9 directly into the vapor space above the liquid to suppress any accumulation of combustible gases within the vapor space above the liquid. In Runs 8 and 9 a liquid level control constituted of a pump, and liquid level regulator for controlling the operation of the pump was provided for setting the liquid residence time to aid in controlling reaction kinetics. The results of operations of this type, depicted by reference to FIG. 4 and described as Runs 3-9 Table 1, are compared to an operation conducted as described by reference to FIG. 2, these latter being described as Runs 1-2 in the Table.

These runs were each conducted over a period of several days with a temperature of 35° C. in the first reactor of the series, with the differential temperature between the two reactors ranging from about 17 to 22 Centigrade degrees. In conducting these runs, SiF$_4$ was fed into the secondary reactor, the total amount of SiF$_4$ fed in the secondary reactor during Run 1 having been 900 pounds/hour and, during Runs 2 through 9, 1000 pounds/hour. Sodium aluminum hydride was introduced in the first reactor of the series, with SiF$_4$ in amount less than required to completely react with the sodium aluminum hydride, during the several runs, the amount of the hydride after dilution with DME and toluene in Run 1 having been 0.07 percent, and in all of Runs 2-9, respectively, 0.08 percent, based on weight. In the secondary reactor during Runs 1 and 2, 0.05 and 0.07 percent of sodium aluminum hydride, respectively, based on the amount of sodium aluminum hydride in the feed to the initial reactor of the series, was converted; and in each of Runs 3-9, 0.08 percent of the sodium aluminum hydride was converted. Essentially complete conversion of the sodium aluminum hydride took place in each run within the two reactors of the series, with the major amount of the conversion of silane, and a coproduct sodium aluminum fluoride, having been obtained in the first reactor of the series. The pressure in the secondary reactor, in pounds per square inch gauge (psig), during each of the several runs was as follows to wit: In Run 1 28 psig; In Runs 2-4 21 psig; In Runs 5-7 16 psig; and in Runs 8-9 6 psig. SiF$_4$ was introduced into the secondary reactor in total amount in excess of that required to react with the unreacted sodium aluminum hydride passed from the first reactor to the second reactor of the series. Table 1 lists in separate columns for each of the runs (a) the ratio of the amount of SiF$_4$ introduced via a dipleg directly into the liquid relative to the total amount of SiF$_4$ introduced into the secondary reactor (Column 3), this being referred to in the Table as "SiF$_4$ split"; (b) the residence time in minutes of the liquid within the secondary reactor (Column 4); and (c) the amount of agitation in HP/gallon applied to the liquid of the secondary reactor during the reaction (Column 5). The first column of Table 1 gives the Run Number, and Column 2 the analytical results for the total SiO$_2$ found in the sodium aluminum fluoride product for each of the several runs.

TABLE 1

| Run No. | SiO$_2$ In Sodium Aluminum Fluoride | SiF$_4$ Split | Residence Time, Minutes | Agitation HP/gal |
|---------|-------------------------------------|---------------|-------------------------|------------------|
| 1 | 2.74 | 1.00 | 14.95 | 0.0549 |
| 2 | 1.99 | 1.00 | 7.58 | 0.0549 |
| 3 | 1.03 | 0.20 | 7.58 | 0.0549 |
| 4 | 1.61 | 0.30 | 7.58 | 0.0549 |
| 5 | 0.66 | 0.35 | 5.46 | 0.0068 |
| 6 | 0.66 | 0.35 | 5.46 | 0.0046 |
| 7 | 0.43 | 0.30 | 5.46 | 0.0040 |
| 8 | 0.54 | 0.30 | 7.58 | 0.0033 |
| 9 | 0.34 | 0.27 | 7.58 | 0.0033 |

These data clearly illustrate, inter alia, the advantages of reducing the amount of SiF$_4$ fed directly into the liquid phase of the secondary reactor, and the amount of agitation applied to the liquid contents of the secondary reactor during the reaction to control mass transfer. It also clearly shows the advantages, at these conditions, of reducing the residence time of the liquid within the secondary reactor during the reaction to control the kinetics of the reaction.

EXAMPLE 4

In an additional run the secondary reactor of the unit, as employed in conducting Runs 3-7 described in Example 3, was controlled to provide an SiF$_4$ split of 0.35 and a total liquid residence time of 5.46 minutes, while the amount of liquid agitation was varied over a range of values. The first column of Table 2 lists the amount of agitation in HP/gallon applied to the liquid, and the second column thereof the amount of SiO$_2$ found by analysis in the sodium aluminum fluoride product produced at the different levels of agitation.

TABLE 2

| Agitation HP/gallon | % SiO$_2$ In Sodium aluminum fluoride |
|---|---|
| 0.0763 | 1.50 |
| 0.0763 | 1.29 |
| 0.0646 | 1.07 |
| 0.0611 | 0.86 |
| 0.0451 | 0.64 |
| 0.0322 | 0.56 |
| 0.0220 | 0.47 |
| 0.0129 | 0.47 |
| 0.0084 | 0.77 |
| 0.0076 | 0.86 |
| 0.0068 | 0.99 |
| 0.0060 | 0.49 |
| 0.0060 | 0.36 |
| 0.0060 | 0.41 |
| 0.0046 | 0.34 |
| 0.0046 | 0.36 |
| 0.0046 | 0.34 |
| 0.0046 | 0.34 |
| 0.0046 | 0.39 |
| 0.0046 | 0.41 |
| 0.0046 | 0.36 |

These results, it is clear, show a definite advantage in controlling at low levels the amount of agitation applied to the liquid during the reaction.

Following the procedure of the above examples, KAlH$_4$, NaH, KH or LiH can be reacted with SiF$_4$ or SiCl$_4$. Also, LiAlH$_4$ and NaAlH$_4$ can be reacted with SiCl$_4$. Mixtures such as NaH and NaAlH$_4$ can also be used.

These reactions can be conducted using an ether reaction medium such as discussed above, and by reacting from about 90-99% of the metal hydride in the primary reactor and the remainder in the secondary reactor.

The process temperature is within the range of from 10°-65° C. and the processes are preferably conducted at atmospheric pressure. When SiCl$_4$ is used as a liquid, the temperature is maintained below 59° C.

The RTDs used are exemplified by 100 ohm plantinum RTOS, 24 inches long, ¼" O.D. 316 stainless steel sheath, 3 wire, 1 foot extension supplied by Child's Instruments. The silane product can be separated from the other materials by its difference in boiling point.

The process of this invention can be extended to other reactive systems, to produce stoichiometric or substantially stoichiometric operation. The process and loop arrangement of this invention can be utilized where it is desired to achieve a degree of stoichiometry, not otherwise readily attainable by use of a batch reactor or a single back-mix reactor of economical size. For use with this invention, the reactants employed should react rapidly; preferably, an instantaneous or practically instantaneous reaction is used. Also, it is preferred that there not be competing reactive mechanisms which enable the reactants to combine in more than one way. If there are competing mechanisms, one should predominate, so that most if not all the reactants react by that mechanism when contacted under the reaction conditions employed.

The reactants employed should not give different product(s) depending on the relative concentration of the reactants in the reaction zone. The process must be sufficiently exothermic in order to enable the heat of reaction to be used to generate an adequate signal to (a) monitor the reaction, and (b) to provide the feedback necessary to rapidly alter the rate of feed of one or more reactants. Indicia other than heat, e.g. pH, might be useful in monitoring other reactions conducted according to this invention.

The products produced should be readily separable so that they can be removed from the loop. The product(s) formed are preferably not reactive with additional quantities of reactant(s) under the reaction conditions employed.

The process of this invention provides a means for preparing silane from metal hydrides. It is possible to vary certain aspects of the invention including the metal containing compound and silicon compound used as starting materials, the reaction media, and the configuration and type of equipment utilized in the process without departing from the scope and spirit of the invention as defined by the appended claims.

We claim:

1. In a continuous process for preparing silane and a coproduct comprising a metal and a halogen, wherein are included the steps of
  (A) reacting in a first reaction zone and in a liquid reaction medium, a metal hydride reactant selected from alkali metal hydrides and alkali metal aluminum hydrides, with less than a stoichiometric quantity of a silicon halide selected from compounds having the formula SiX$_4$, wherein X is fluorine, chlorine, or bromine;
  (B) reacting in a second reaction zone, the metal hydride remaining in the liquid reaction medium, above which a vapor space is provided, with a quantity of SiX$_4$ reactant in excess of that required to react with said remaining metal hydride;
  (C) separating in a separation zone, a gaseous fraction comprising silane and unreacted silicon halide from solid reaction product suspended in a diluting solution and produced in said reaction zones;
  (D) recovering said silane;
  (E) introducing unreacted silicon halide from said second reaction zone into said first reaction zone to react with an additional quantity of metal hydride;
  (F) determining the difference in temperature between the temperature of reaction liquid in said second reaction zone, and the temperature of reactant liquid substantially immediately prior to entry into said second zone; and
  (G) utilizing a signal derived from said difference in temperature to regulate the flow of a reactant t a reaction zone to achieve substantially stoichiometric reaction of the total amounts of silicon halide and metal hydride reacted in both reaction zones, the improvement comprising
  (H) splitting the SiX$_4$ reactant introduced to said second reaction zone (B) into two streams,
    (a) a first SiX$_4$ stream which is introduced directly into the liquid reaction mixture to improve mass transfer between the liquid and gaseous phases, and
    (b) a second SiX$_4$ stream which is introduced into the separation zone or directly into the vapor space above said liquid reaction mixture, or into both the separation zone and the vapor space to suppress the formation of combustible gaseous mixtures.

2. The process of claim 1 wherein said metal hydride is an alkali metal hydride wherein the alkali metal is selected from lithium, sodium, and potassium.

3. The process of claim 1 wherein said metal hydride is an alkali metal aluminum hydride wherein said alkali metal is selected from lithium, sodium, and potassium.

4. The process of claim 1 wherein said silicon halide is selected from $SiF_4$ and $SiCl_4$.

5. The process of claim 1 wherein the ratio of the $SiX_4$ introduced directly into the liquid reaction mixture of said second reaction zone, relative to the total amount of $SiX_4$ introduced into said second reaction zone, as described in step (H), ranges from about 0.20 to about 0.40.

6. The process of claim 5 wherein the ratio of the $SiX_4$ introduced directly into the liquid reaction mixture relative to the total amount of $SiX_4$ introduced into said second reaction zone ranges from about 0.23 to about 0.30.

7. The process of claim 1 wherein the liquid reaction mixture of said second reaction zone is stirred at agitation levels such that there is sufficient further control of mass transfer between the liquid and gaseous phases.

8. The process of claim 7 wherein the liquid reaction mixture of said second reaction zone is stirred at agitation levels ranging from about 0.0033 HP/gal to about 0.0068 HP/gal of energy input.

9. The process of claim 1 wherein the residence time of the liquid reaction mixture in said second reaction zone ranges from about 0.5 minutes to about 30 minutes.

10. The process of claim 9 wherein the residence time of the liquid reaction mixture in said second reaction zone ranges from about 5 minutes to about 10 minutes.

11. In a process for the preparation of silane, and a metal halide coproduct wherein an alkali metal aluminum hydride is reacted with a silicon tetrahalide, and wherein are included the steps of:
(I) introducing said alkali metal aluminum hydride reactant and a liquid reaction medium at a substantially constant flow rate into a primary reaction zone, and reacting said hydride in said zone with less than a stoichiometric quantity of silicon halide reactant, such that from about 90 to about 99 weight percent of the alkali metal aluminum hydride introduced is reacted in said zone;
(II) reacting, in a second reaction zone, the unreacted alkali metal hydride component of said liquid reaction mixture above which a vapor space is provided, and wherein silicon halide is introduced at a rate that is at least substantially stoichiometric with the amount of alkali metal aluminum hydride introduced into said first reaction zone;
(III) separating, in a separation zone, silane product and unreacted silicon halide from a slurry introduced from said secondary reaction zone comprising: (i) metal-aluminum-halogen containing coproduct, and (ii) said liquid reaction medium;
(IV) recovering said silane;
(V) introducing unreacted silicon halide from said second reaction zone into said first reaction zone for reaction with additional alkali metal aluminum hydride introduced into said zone;
(VI) determining the difference in temperature between the temperature of the liquid reaction medium in said second reaction zone, and the temperature of reactant liquid medium from said first reaction zone substantially immediately prior to entry into said second zone; and
(VII) utilizing a signal derived from said difference in temperature to regulate the flow of silicon halide to the second reaction zone to achieve substantially stoichiometric reaction of the total amounts of silicon halide and metal hydride reacted in both reaction zones, the improvement comprising
(VIII) splitting the silicon halide reactant introduced into said second reaction zone (II) into two steams, (a) a first silicon halide stream which is introduced directly into the liquid mixture to control mass transfer between the liquid and gaseous phases, and (b) a second silicon halide stream which is introduced into the separation zone or directly into the vapor space above said liquid reaction mixture, or into both the separation zone and the vapor space to suppress the formation of combustible gaseous mixture.

12. The process of claim 11 wherein said alkali metal aluminum hydride is selected from $LiAlH_4$, $NaAlH_4$, and $KAlH_4$.

13. The process of claim 12 wherein said hydride is $LiAlH_4$.

14. The process of claim 12 wherein said hydride is $NaAlH_4$.

15. The process of claim 11 wherein said silicon halide is selected from $SiF_4$ and $SiCl_4$.

16. The process of claim 15 wherein said silicon halide is $SiF_4$.

17. The process of claim 11 wherein the liquid reaction mixture comprises an ether.

18. The process of claim 17 wherein said ether is mixed with a hydrocarbon.

19. The process of claim 11 wherein the ratio of the silicon halide introduced directly into the liquid reaction mixture of said second reaction zone relative to the total amount of silicon halide introduced into said second reaction zone, as described in step (VIII), ranges from about 0.20 to about 0.40.

20. The process of claim 19 wherein the ratio of the silicon halide introduced directly into the liquid reaction mixture relative to the total amount of silicon halide introduced into said second reaction zone ranges from about 0.23 to about 0.30.

21. The process of claim 11 wherein the liquid reaction mixture of said second reaction zone is stirred at agitation levels such that there is sufficient further control of mass transfer between the liquid and gaseous phases.

22. The process of claim 21 wherein the liquid reaction mixture of said second reaction zone is stirred at agitation levels ranging from about 0.0033 HP/gal to about 0.0068 HP/gal of energy input.

23. The process of claim 11 wherein the residence time of the liquid reaction mixture in said second reaction zone ranges from about 0.5 minutes to about 30 minutes.

24. The process of claim 23 wherein the residence time of the liquid reaction mixture in said second reaction zone ranges from about 5 minutes to about 10 minutes.

25. In a continuous process for preparing silane and a coproduct comprising a metal and a halogen, wherein the process includes the steps of (a) reacting in a first reaction zone, an alkali metal hydride or alkali metal aluminum hydride with less than a stoichiometric quantity of silicon tetrahalide; (b) reacting in a second reaction zone in a liquid reaction mixture the remaining metal hydride from the first reaction zone, with a stoichiometric excess of the silicon tetrahalide reactant; and (c) separating in a separation zone the reactants from the second reaction zone, into a gaseous fraction comprising silane and unreacted silicon tetrahalide and a solid reaction product suspended in a diluting solution; the improvement which comprises splitting the silicon tetrahalide reactant introduced to the second reaction zone into two streams:

(1) a first silicon tetrahalide stream which is introduced directly into the liquid reaction mixture to improve mass transfer between the liquid and gaseous phases, and (2) a second silicon tetrahalide stream which is introduced into the separation zone or directly into the vapor space above said liquid reaction mixture, or into both the separation zone and the vapor space to suppress the formation of combustible gaseous mixtures.

26. The process of claim 25 wherein the alkali metal of the alkali metal hydride is lithium, sodium, or potassium.

27. The process of claim 25 wherein the alkali metal of the alkali metal aluminum hydride is lithium, sodium, or potassium.

28. The process of claim 25 wherein the silicon tetrahalide is $SiF_4$ or $SiCl_4$.

29. The process of claim 25 wherein the ratio of the silicon tetrahalide introduced directly into the liquid reaction mixture of said second reaction zone, relative to the total amount of silicon tetrahalide introduced into said second reaction zone ranges from about 0.20 to about 0.40.

30. The process of claim 29 wherein the ratio of the silicon tetrahalide introduced directly into the reaction mixture relative to the total amount of silicon tetrahalide introduced into said second reaction zone ranges from about 0.23 to about 0.30.

31. The process of claim 25 wherein the liquid reaction mixture of said second reaction zone is stirred at agitation levels such that there is sufficient further control of mass transfer between the liquid and gaseous phases.

32. The process of claim 31 wherein the liquid reaction mixture of said second reaction zone is stirred at agitation levels ranging from about 0.0033 HP/gal to about 0.0068 HP/gal of energy input.

33. The process of claim 25 wherein said metal aluminum hydride is $LiAlH_2$ or $NaAlH_4$ and said silicon tetrahalide is $SiF_4$.

34. The process of claim 25 wherein the residence time of the liquid reaction mixture in said second reaction zone ranges from about 0.5 minutes to about 30 minutes.

35. The process of claim 34 wherein the residence time of the liquid reaction mixture in said second reaction zone ranges from about 5 minutes to about 10 minutes.

36. The process of claim 25 wherein the liquid reaction mixture comprises an ether.

37. The process of claim 36 wherein said ether is mixed with a hydrocarbon.

38. The process of claim 25 wherein said metal aluminum hydride is $LiAlH_2$ and said silicon tetrahalide is $SiF_4$.

* * * * *